United States Patent [19]

Hukai

[11] Patent Number: 5,599,455
[45] Date of Patent: Feb. 4, 1997

[54] DETERGENT-FREE WASHING WATER, METHOD AND APPARATUS FOR MAKING THE WASHING WATER, AND WATER/OIL SEPARATION METHOD FOR SEPARATING MATTERS EMULSIFIED WITH THE WASHING WATER INTO WATER AND OIL PHASES

[76] Inventor: Toshiharu Hukai, 1112-1, Ooaza-hakeyama, Kitamimaki-mura, Kitasaku-gun, Nagano, Japan

[21] Appl. No.: 495,400

[22] PCT Filed: Feb. 23, 1994

[86] PCT No.: PCT/JP94/00272

§ 371 Date: Mar. 14, 1996

§ 102(e) Date: Mar. 14, 1996

[87] PCT Pub. No.: WO94/19285

PCT Pub. Date: Sep. 1, 1994

[30] Foreign Application Priority Data

Feb. 26, 1993 [JP] Japan .............................. 5-012717 U
Jan. 25, 1994 [JP] Japan .................................. 6-023066

[51] Int. Cl.$^6$ ............................... C02F 1/42; C02F 1/48
[52] U.S. Cl. .......................... 210/663; 210/687; 210/688; 210/748; 210/749; 210/243; 210/259; 210/266; 210/283; 210/284; 204/155; 204/164
[58] Field of Search .................... 210/691, 692, 210/693, 266, 663, 749, 283, 284, 687, 688, 695, 748, 259, 243, 222, 223; 204/155, 164

[56] References Cited

U.S. PATENT DOCUMENTS 4,483,756  11/1984  Lowther ................................. 204/155
5,108,618  4/1992  Hirasawa ............................... 210/689

FOREIGN PATENT DOCUMENTS

444815A2  9/1991  European Pat. Off. .

OTHER PUBLICATIONS

"Legionella Contamination Prevention for Cooling Systems," *New Technology Japan*, vol. 18, No. 9, Dec. 1990.

"Surface Tension and Permeability of Water Treated by Polar Crystal Tourmaline", Nippon Shokuhin Kogyo Gakkaishi vol. 38, No. 5, p. 422 (1991).

Kubo, "Interface Activity of Water Given Rise by Tourmaline", Solid State Physics, vol. 24, No. 12 Dec. 1989.

*Primary Examiner*—Cynthia L. Nessler
*Attorney, Agent, or Firm*—Lorusso & Loud

[57] ABSTRACT

Washing water containing hydroxyl ions ($H_3O_2^-$) and hydronium ions ($H_3O_2^-$) is prepared by connecting soft water generators (10), (12) each having an ion exchange resin (32), and an ion generator having a tourmaline mixture of tourmaline and a metal, and passing water through the ion exchange resin (32) and the tourmaline mixture (46). Water emulsified by removing stains such as of oils with the washing water is a kind of O/W emulsion wherein the hydroxyl ions ($H_3O_2^-$) and hydronium ions ($H_3O_2^-$) have oil wrapped therein. The aqueous O/W emulsion is mixed with hard water such as city water, whereupon the hydroxyl ions ($H_3O_2^-$) and hydronium ions ($H_3O_2^-$) covering the oil therewith are converted to water, thereby permitting the oil and oil-free water to be separated from each other.

13 Claims, 3 Drawing Sheets

DETERGENT-FREE WASHING WATER, METHOD AND APPARATUS FOR MAKING THE WASHING WATER, AND WATER/OIL SEPARATION METHOD FOR SEPARATING MATTERS EMULSIFIED WITH THE WASHING WATER INTO WATER AND OIL PHASES

TECHNICAL FIELD

This invention relates to washing water which is capable of removing contaminants or stains such as of oils without use of any detergent and also to method and apparatus for making such washing water. The invention also relates to a water/oil separation method wherein emulsified water obtained by removing contaminants such as of oils with the washing water is separated into water and an oil component.

TECHNICAL BACKGROUND

Contaminants which are deposited on products or parts in mills and are unlikely to come out or stains on clothes, tablewares or bathtubs in the home usually contain oily substances. The contaminants or stains containing the oily substances have been hitherto remove by means of detergents and water. Detergents, in turn, contain not less than 20% of surface active agents. The water obtained by removing oil stains with surface active agents is a kind of emulsion, whichever O/W emulsion or W/O emulsion, caused by the emulsifying action of the surface active agent.

At present, any provision has not been regulated with respect to the discharge of waste water from domestic life. Where waste water from mills is discharged to rivers or seas, emulsified water is prohibited from discharge. More particularly, only water after removal of oily substances therefrom has been permitted to be discharged to rivers or seas. Industrial waste water from a diversity of companies has to be one which is obtained by separating emulsified water into water and oil phases and removing the oil phase therefrom.

Prior art methods of separating emulsified water into water and oil phases include (1) a natural separation method using gravity, (2) a centrifugal separation method using centrifugal separators, (3) a filtration method using passage through a filtering machine under pressure, (4) a heating method comprising heating at 40°–60° C. and separating in a heating condition, (5) a high voltage electric field method wherein a high voltage of about 10000 V is applied, and (6) a chemical treating method which makes use of chemicals capable of de-emulsifying the emulsion. According to any of these methods (1)–(6), it takes much time before separation into water and oil phases or the equipment costs become very high. Thus, the prior art methods could not separate the an aqueous emulsion into oil and water phases at low costs within a short in a simple manner.

Washing water for products and parts in mills usually contain rust preventives. This is because ordinary water such as city or well water (usually hard water) contains metallic ions such as $Ca^{2+}$, $Mg^{2+}$, $Fe^{2+}$ and the like, so that when the water is used for washing and deposited on the surfaces such as of products, these ions cause corrosion. Where products or parts are washed with detergents containing rust preventives, these products or parts have to be rinsed with clean water again. This requires additional costs for the rust preventives and an additional rinsing step.

Under these circumstances in the art, the invention has for its object the provision of washing water which is able to remove stains or contaminants such as of oils without use of any detergent and also method and apparatus for making the washing water at low costs by a simple manner.

Another object of the invention is to provide a method for immediately separating emulsified water obtained by removing oily substances with surface active agent-free water into oil phase and oil-free water phase.

DISCLOSURE OF THE INVENTION

In order to achieve the above objects, there is provided, according to the invention, a method for making washing water which comprises passing water through an ion exchange resin and a mixture of tourmaline and a metal or metals in this order.

An apparatus for making washing water according to the invention comprises a soft water generator accommodating an ion exchange resin therein, and an ion generator accommodating a mixture of tourmaline and a metal therein and connected with the soft water generator, wherein water passing through the ion generator is jetted against the tourmaline and the metal under hydraulic pressure so that the tourmaline and the metal are agitated within the ion generator.

Moreover, according to the invention, there is also provided a method for separating emulsified washing water obtained after removal of oil stains with washing water into an oil phase and an oil-free water phase, which method comprising passing water through an ion exchange resin and a mixture of tourmaline and a metal in this order, removing oil stains with the resultant washing water, and mixing the thus oil stain-removed, emulsified washing water with hard water.

The washing water of the invention is one which is obtained by passing water such as city water through an ion exchange resin and a mixture of tourmaline and a metal.

Initially, water is passed through a soft water generator having an ion exchange resin therein wherein metallic ions such as $Ca^{2+}$, $Mg^{2+}$, $Fe^{2+}$ and the like are removed for conversion to soft water and, at the same time, hydronium ions ($H_3O^+$) having detergency are produced in the water. Subsequently, the soft water is passed through the ion generator filled with tourmaline and a metal. By this, hydronium ions ($H_3O^+$) are further produced and the resultant washing water contains a large amount of hydroxyl ions ($H_3O_2^-$) having detergency.

The washing water which has large amounts of hydronium ions ($H_3O^+$) and hydroxyl ions ($H_3O_2^-$), both having detergency, is able to remove oil stains. The water obtained after the removal of oil is emulsified.

The oil stain-removed and emulsified water is in the form of an O/W emulsion. When the emulsified water is mixed with ordinary water such as city water, the hydronium ions ($H_3O^+$) and hydroxyl ions ($H_3O_2^-$) covering oil particles therewith are converted to water and the oil is released from the hydronium ions ($H_3O^+$) and hydroxyl ions ($H_3O_2^-$), resulting in separation into oil and water.

BEST MODE FOR CARRYING OUT THE INVENTION

Figure 1:
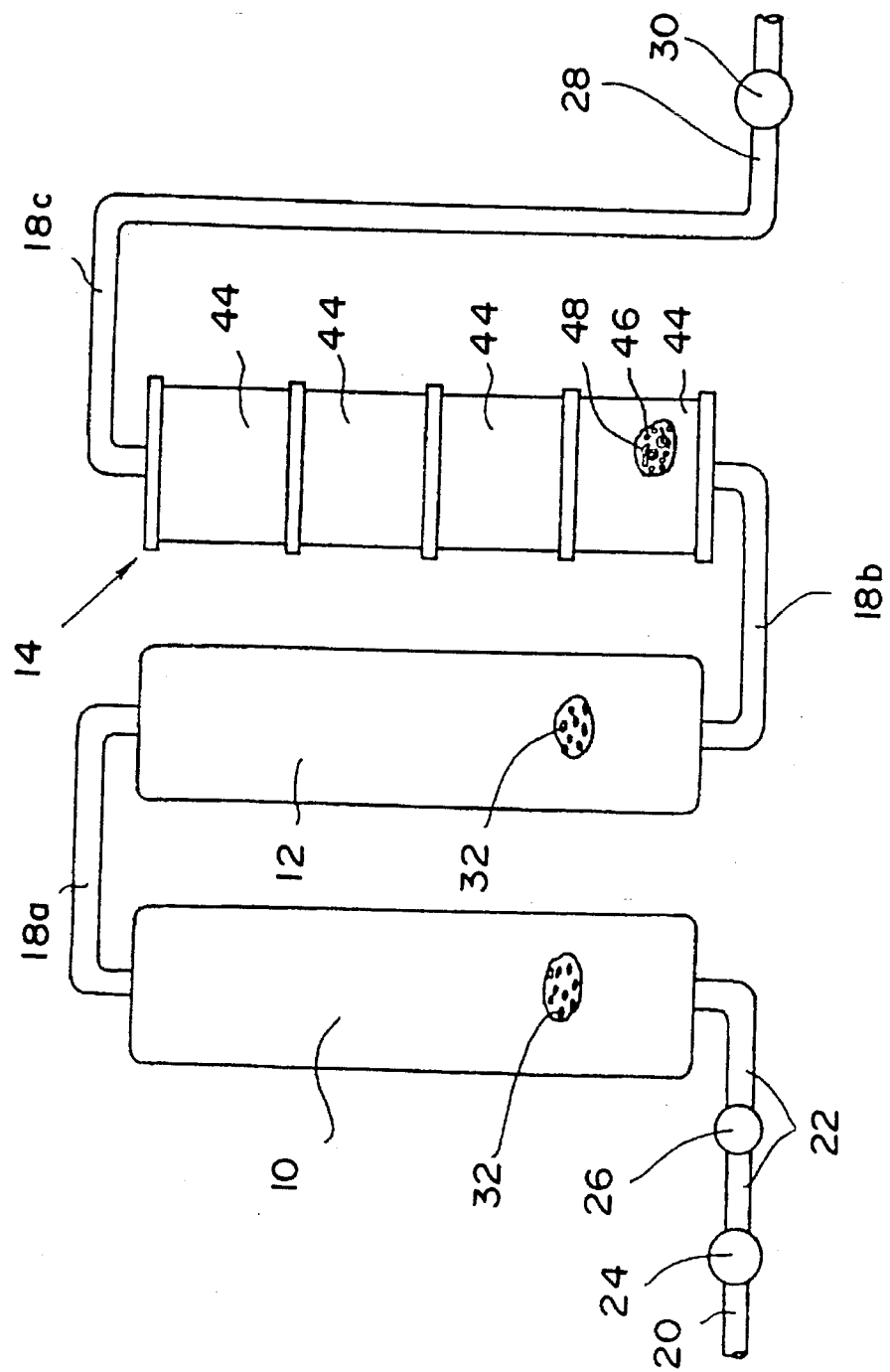
FIG. 1 is a schematic view showing an apparatus for making water having a deterging function according to one embodiment of the invention.

The examples of the invention are described. FIG. 1 is an illustrative view showing an example of an apparatus for making water having a deterging function according to the invention. A first soft water generator 10, a second soft water generator 12, and an ion generator 14, are, respectively, connected through connection pipes 18a and 18b in series.

Pressurized water such as, for example, city water, is supplied to the first soft water generator 10 from a water supply pipe 20 through a connection pipe 22. An on-off inlet valve 24 such as a bib cock between the water supply pipe 20 and the connection pipe 22 with a check valve 26 being provided on the way of the connection pipe 22. A delivery pipe 28 is provided at the outlet side of the ion generator 14 and has an outlet on-off valve 30 at the tip of or on the way of the delivery pipe 28.

With city water, water fed from the water supply pipe 20 is passed to the first soft water generator 10, the second soft water generator 12 and the ion generator 14 in this order and is finally taken out from the delivery pipe 28 by opening the on-off valve 30.

With the case other than city water, water stored in a water reservoir is introduced through the supply pipe 20 into the first soft water generator 10 by means of a pump although not particularly shown. In the case, a check valve 26 is provided between the pump and the first soft water generator 10.

Figure 2:
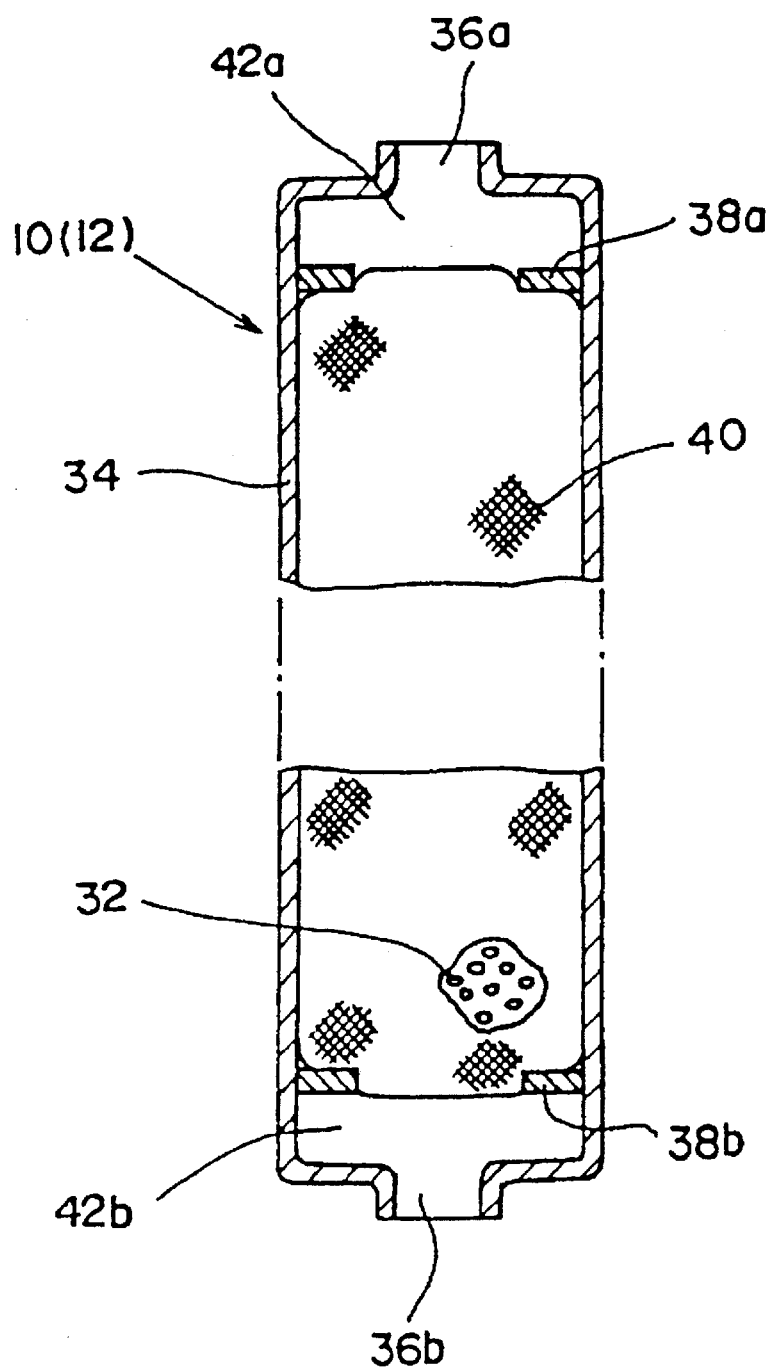
FIG. 2 is a schematic sectional view of a soft water generator used in the apparatus shown in FIG. 1.

The first soft water generator 10 and the second soft water generator 12, respectively, contain a large quantity of a particulate ion exchange resin 32 therein, with its section being shown in FIG. 2. The soft water generators 10, 12 have, respectively, a body 34 which is cylindrical in shape and has water outlet and inlet ports 36a, 36b at upper and lower ends thereof, respectively. The cylindrical body 34 is provided with shield members 38a, 38b at inner wall surfaces kept slightly away from the upper and lower ends thereof as having, respectively, an opening at the center thereof. The ion exchange resin 32 contained in a fine net 40 is accommodated between the paired shield members 38a, 38b.

The reason why the shield members 38 each having the opening at the center thereof are provided at the inner walls positioned slightly away from the outlet and inlet ports 36a, 36b is that the fine net 40 having the ion exchange resin 32 is placed between the paired shield members 38 to establish spaces 42a, 42b in the vicinity of the outlet and inlet portions 36a, 36b, respectively. The passage of water through the central openings of the shield members 38a, 38b permits invariable contact of water with the ion exchange resin 32. The reason why the ion exchange resin is placed in the net 40 is that the particulate ion exchange resin 32 can be wholly removed along with the net 40 when the particulate resin 32 is washed.

The first and second soft water generators 10 and 12 have, respectively, a height of 80 cm and an inner diameter of 10 cm, for example. The height of accommodation of the ion exchange resin 32 is set, for example, at 70 cm (permitting the upper and lower spaces 42a, 42b to be established). The height of accommodation of the ion exchange resin 32 should be at least sufficient to satisfactorily effect ion exchange. On the other hand, when the height of the accommodated ion exchange resin 32 is too great (e.g. over about 200 cm in the height of the accommodated ion exchange resin 32), the ion exchange resin becomes resistant to the passage of water, resulting in a reduced flow rate of water passing through the inside of the soft water generators. Accordingly, the height of the accommodated resin 32 should be determined as not reducing the flow rate.

The two containers for accommodating the ion exchange resin 32 are used. The reason for this is that the first and second soft water generators 10, 12 are suppressed in height to substantially such a level as the ion generator 14 and the rock accommodating container 16 and that it is avoided to reduce the flow rate owing to the pressure loss of water passing therethrough. Of course, the two soft water generators 10, 12 may be combined together to provide one soft water generator. Depending on the flow rate of water, the inner diameter of the soft water generators, the height of the accommodated ion exchange resin 32 and the number of the soft water generators connected in series may be optionally determined.

The ion exchange resin 32 serves to eliminate metal ions such as $Ca^{2+}$, $Mg^{2+}$, $Fe^{2+}$ and the like from water to provide soft water. The ion exchange resin 32 used is, for example, a strongly acidic cationic exchange resin ($RzSO_3Na$) obtained by uniform sulfonation of a sphere-shaped styrene-divinylbenzene copolymer. The ion exchange resin 32 undergoes the following ion exchange reaction with the metal ions such as $Ca^{2+}$, $Mg^{2+}$, $Fe^{2+}$ and the like.

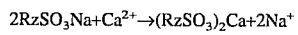

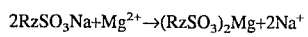

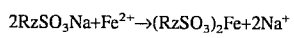

$Ca^{2+}$, $Mg^{2+}$, $Fe^{2+}$ and the like can be eliminated from water by passage through the ion exchange resin 32. The use of the strongly acidic cationic exchange resin ($RzSO_3Na$) as the ion exchange resin 32 results in formation of sodium ions ($Na^+$). The ion exchange resin 32 may be one which is able to produce ions other than $Na^+$ and should preferably one which produces $Na^+$.

If city water is used, chlorine is contained aside from the metal ions such as $Ca^{2+}$, $Mg^{2+}$, $Fe^{2+}$ and the like. The chlorine undergoes no change when city water is passed through the ion exchange resin 32.

On the other hand, when water ($H_2O$) is passed through the ion exchange resin 32, the following changes take place

As shown in (1) and (2) above, when water has been passed through the ion exchange resin 32, hydroxide ions ($OH^-$) and hydronium ions ($H_3O^+$) are produced. The hydronium ions ($H_3O^+$) have the surface activity.

If hard water is used and passed through the ion exchange resin 32, the metal ions such as $Ca^{2-}$, $Mg^{2+}$, $Fe^{2+}$ and the like are eliminated from the water to provide soft water. The passage through the ion exchange resin 32 results in the generation of $Na^+$, $OH^-$ and hydronium ions ($H_3O^+$) in the water. Nevertheless, chlorine (Cl) in city water is passed as it is without undergoing ionization. It will be noted that depending on the type of ion exchange resin 32, $Na^+$ is not produced at all.

Figure 3:
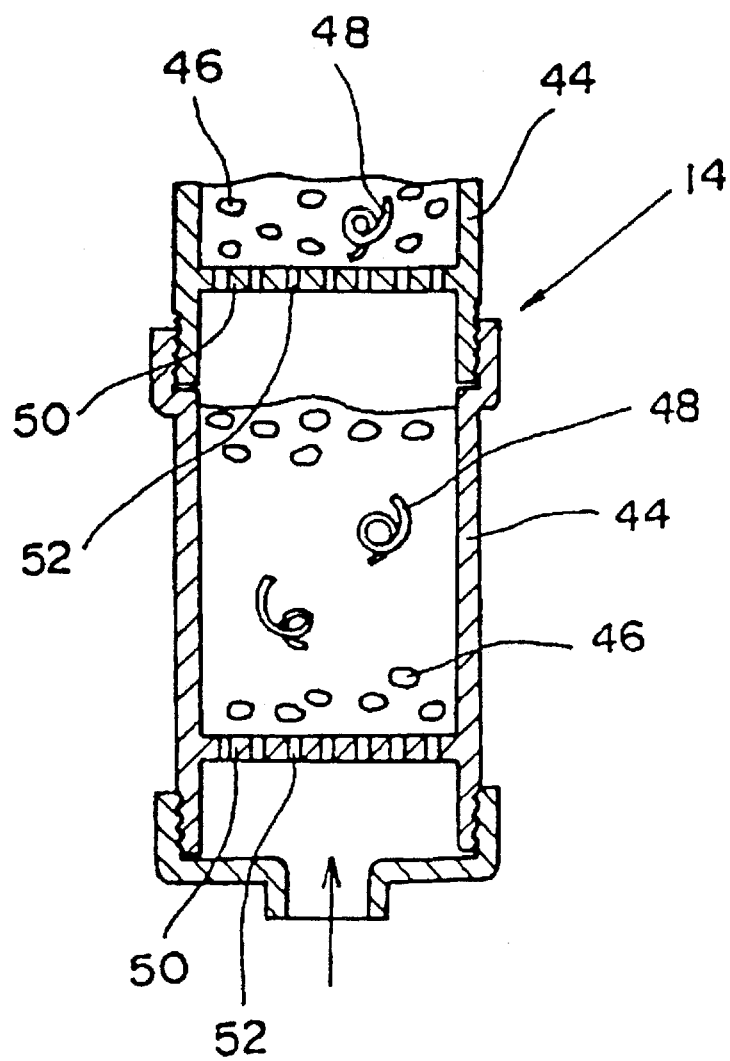
FIG. 3 is a schematic sectional view of an essential part of an ion generator used in the apparatus of FIG. 1.

The partial sectional view of the ion generator 14 is shown in FIG. 3. The ion generator 14 has a plurality of cartridges 44 arranged in a similar manner and continuously connected in series vertically. The individual cartridges 44 have particulate tourmaline 46 and a plate-shaped metal 48 accommodated therein.

Tourmaline has plus and minus electrodes, with which an electromagnetic wave having a wavelength of 4~14 micrometers is applied to water, so that clusters of water are cleaved off thereby generating hydronium ions ($H_3O^+$). The electromagnetic wave having a wavelength of 4~14 micrometers has an energy of 0.004 watts/cm$^2$.

The tourmaline 46 used herein may consist of fine pieces of tourmaline. Alternatively, the tourmaline 46 may be a tourmaline mixture called tourmaline pellets which are commercially available as containing tourmaline, a ceramic and aluminum oxide (which may contain silver therein) at mixing ratios by weight of about 10:80:10. The ceramic contained in the tourmaline pellets acts to keep the plus and minus electrodes separated from each other. The tourmaline 46 may be made by mixing not less than 5 wt %, based on the ceramic, of tourmaline 46 with the ceramic and heating the mixture at 800° C. or over by which the resultant tourmaline disappears within a given period of time under agitation in water (e.g. within about 3 months for a pellet diameter of 4 mm).

The metal 48 used may be at least one selected from aluminum, a stainless steel and silver. The metal 48 should preferably be one which is not corroded in water and is not soluble in water. Of these metals 48, aluminum has the bactericidal or antifungal action and the bleaching function. Stainless steel has the bactericidal or antifungal action and the detergency-improving action and silver has the bactericidal or antifungal action. Silver is greater in bactericidal or antifungal activity than aluminum and stainless steel. Accordingly, if bleaching action is necessary along with more improved bactericidal or antifungal action, silver is mixed with aluminum. Copper or lead is not used as the metal 48 because of its toxicity. Expensive materials such as gold are not adopted in view of the economy.

The incorporation of the metal 48 results in an increasing amount of generation of hydronium ions ($H_3O^+$) and hydroxyl ions ($H_3O_2^-$) as will be described hereinafter. Of these metals 48, aluminium is most preferred from the standpoint of costs and the amount of generation of hydronium ions ($H_3O$) and hydroxyl ions ($H_3O_2^-$).

The tourmaline 46 and the metal 48 are preferably mixed at a ratio by weight of approximately 10:1~1:10. More preferably, the ratio by weight between the tourmaline 46 and the metal 48 is in the range of 1:2~1:6. Preferably, the ratio by weight between commercially available tourmaline pellets having ratios by weight of tourmaline, a ceramic and aluminium oxide of 10:80:10 and the metal 48 of 5:1~5:2. This weight ratio is determined while taking into consideration the rates of generation of the hydronium ions ($H_3O$) and hydroxyl ions ($H_3O_2^-$).

The cartridge 44 is in the form of a hollow cylinder opened at one end thereof and has a multitude of holes 52 at the bottom 50 thereof. The size of the holes is so set that where the tourmaline mixture 46 and the metal 48 are placed in the cartridge 44, the tourmaline 46 and the metal 48 do not pass through the holes 52 at the bottom 50.

A shown in FIG. 3, the bottom 50 of the respective cartridges 44 having a multitude of holes 52 is set at a lower side, on which the tourmaline 46 and the metal 48 are placed. It is so designed that water is run from the bottom toward to the top of the respective cartridges 44. More particularly, in the cartridges 44, water passing through a multitude of holes 52 at the bottom 50 is passed as jetting upwardly through the tourmaline 46 and the metal 48. It will be noted that the size and number of the holes are so set that city water having a high hydraulic pressure is caused to vigorously collide with the tourmaline 46 and the metal 48. For the agitation of the tourmaline 46 and the metal 48 within the cartridges 44 by the force of pressurized water, there may be used various means. Any known agitation means may be used for this purpose.

The reason why the tourmaline is agitated by jetting water toward the tourmaline is that the tourmaline and water are frictionally contacted under the agitation, with the result that the electrodes are dissolved out in water to cleave the clusters of water, thereby generating a large quantity of hydronium ions ($H_3O^+$) and hydroxyl ions ($H_3O_2^-$). The jetting of pressurized water such as city water through the holes 52 toward tourmaline may omit additional provision of any agitator means.

In practical installment instance, four cartridges 44, each having an accommodation capacity with an inner diameter of 5 cm and a depth of 7 cm, are put one on another. The tourmaline 44 and the metal 48 are charged in the respective cartridges 44 in such a amount that the tourmaline 46 and the metal 48 can be freely moved within the cartridge 44. The number of the cartridges 44 may be increased or decreased. In a specific instance, only one cartridge 44 having a great accommodation capacity may be used.

The tourmaline 46 and the metal 48 are, respectively, placed in a plurality of cartridges 44 having a reduced capacity. The plural cartridges 44 are connected wherein the agitation efficiency of the tourmaline 46 and the metal 48 by the force of water can be enhanced.

The tourmaline 46 contained in the cartridge 44 disappears in several months by dissolution in water. The cartridges 44 are arranged as to be readily detached such as by screwing, permitting easy supplement of the tourmaline 46 in the respective cartridges 44. It will be noted that the metal which is not dissolved in water has no need of supplement but a fresh cartridge containing tourmaline 46 and a metal 48 may be used for substitution with a used one. The capacity of the cartridge 44 may vary depending on the flow rate.

The tourmaline 46 has plus and minus electrodes. When tourmaline is agitated in water, water ($H_2O$) dissociates into hydrogen ions ($H^+$) and hydroxide ions ($OH^-$)

$$H_2O \rightarrow H^+ + OH^- \tag{1}$$

Further, hydronium ions ($H_3O^+$) having surface activity are produced from the hydrogen ions ($H^+$) and water ($H_2O$). The amount of the produced hydronium ions ($H_3O^+$) is far much larger than that generated by means of the ion exchange resin 32

$$H_2O + H^+ \rightarrow H_3O^+ \tag{2}$$

The hydroxide ions ($OH^-$) combines with water ($H_2O$) to form hydroxyl ions ($H_3O_2^-$)

$$H_2O + OH^- \rightarrow H_3O_2^- \tag{3}$$

The hydroxyl ions ($H_3O_2^-$) have high surface activity like hydronium ions ($H_3O^+$), serving to remove oil and cleanse clothes.

The water passed through the ion exchange resin 32 is further passed through the ion generator 14. Eventually, hydronium ions ($H_3O^+$), hydroxyl ions ($H_3O_2^-$), $H^+$ and $OH^-$ are generated in water. The chlorine passed through the ion exchange resin 32 and the $Na^+$ generated at the ion exchange resin 32 pass through the ion generator as they are without undergoing any reaction.

As stated hereinabove, water is initially passed through the ion exchange resin 32, and then through the tourmaline 46 and the metal 48 thereby obtaining water (hereinafter referred to as "washing water"). The washing water contains $Na^+$, $Cl^-$, $H^+$, $OH^-$, hydronium ions ($H_3O^+$) and a large quantity of hydroxyl ions ($H_3O_2^-$). The washing water is soft water and has a specific gravity of about 1.4–1.5. Additionally, the washing water has an energy is 0.004 watts/cm² and also has an electromagnetic wave having a wavelength of 4–14 micrometers.

The washing water has the following many effects.

(a) Surface activity

A great amount of the hydronium ions ($H_3O^+$) and a great amount of the hydroxyl ions ($H_3O_2^-$) present in the washing water has high surface activity (O/W type emulsion emulsifying action). If the washing water is placed and used in washing machines, any detergent is not necessary. This water may be applied not only to washing in washing machines, but also to all the domestic detergent fields where detergents are used, e.g. such as in ware-washing machines or for washing bath tubs. In addition, washing water may be used for cleansing oil-contaminated portions such as in mills or for cleansing parts or products.

More particularly, when the washing water is applied for washing all the industrial and domestic articles without use of any detergent. On comparison with the case using detergents, the use of the washing water is better in economy and will not cause any environmental contamination by the effluence of washing waste.

(b) No necessity of rust preventives or rinsing

Since metallic ions such as $Ca^{2+}$, $Mg^{2+}$, $Fe^{2+}$ and the like are removed from the washing water, washing of products or parts in mills with the washing water does not cause corrosion. This makes unnecessity for incorporation of any rust preventive on washing of products or parts in mills with good economy. Moreover, no use of any detergent in washing water needs to rinse the products or parts with clean water after washing them with the washing water, thus being good in economy, (c) Very weak energy activity (rearing light ray)

Tourmaline emits a very weak energy (an electromagnetic wave with a wavelength of 4–14 micrometers). This weak energy subjects great clusters of water to scission (36–38 clusters of city water converted to 3–6 clusters in the washing water), permitting toxic gases or heavy metals included in the cluster to emit to outside. More particularly, toxic gases or heavy metals included in the inside of water are released, thereby providing substantially impurities-free water. As a consequence, it can be utilized for washing precise parts.

(d) Antifungal and bactericidal actions

Aluminum, stainless steels and silver used as the metal 48 have all the antifungal and bactericidal actions. Where $Na^+$ is generated by means of the ion exchange resin 32, $Na^+$ also exhibits the antifungal and bactericidal actions. Eventually, where table wares or clothes or products are washed with the washing water, not only stains come out, but also the bactericidal action is performed.

(e) Bleaching action

Aluminum has the bleaching action. If aluminum is added in large amounts, a bleaching effect appears on washing.

When the washing water is used for removal of oil stains, the hydronium ions ($H_3O^+$) and hydroxyl ions ($H_3O_2^-$) take oil particles as wrapping therein, thereby permitting all types of oil stains to come out. The water used after the removal of oil stains with the washing water serves as an emulsifier for an O//W emulsion (of the type where oil particles are wrapped with water). The use of the washing waster for the removal of oil stains leaves an O/W emulsion. The thus emulsified washing water is prohibited from discharge as it is.

Next, A method for separating the emulsified water after removal of oil stains with washing water into oil and oil-free water phases is described. The water used for washing in the formed of an O/W emulsion obtained after removal of oil stains with the washing water have hydronium ions ($H_3O^+$) and hydroxyl ions ($H_3O_2^-$) taking oil particles therein. The O/W emulsion washing water used for the removal of oil stains is still soft water in nature.

On the other hand, ordinary water (except soft water) such as, for example, city water and well water is hard water. The washing water is just contrary to the ordinary water with respect to the water hardness.

The washing water in the form of the O/W emulsion obtained after removal of oil stains is charged into hard water such as city water. More particularly, a large amount of city water is placed in a vessel, into which the washing water in the form of the O/W emulsion is introduced. Although any trouble may not be produced when hard water such as city water is charged into the O/W emulsion-like washing water, it is usually favorable to charge the O/W emulsion-like washings water into ordinary water.

The charge of the O/W emulsion-like washing water into ordinary water permits mixing of two types of waters which are contrary to each other in nature (hard water and soft water), whereupon the following reactions takes place on the hydronium ions ($H_3O^+$) and the hydroxyl ions ($H_3O_2^-$) having oil particles wrapped therein $$H_3O^+ \rightarrow H_2O + H^+ \qquad 4)$$

$$H_3O_2^+ \rightarrow H_2O + OH^- \qquad 5)$$

$$H^+ + OH^- \rightarrow H_2O \qquad 6)$$

Thus, the hydronium ions ($H_3O^+$) and the hydroxyl ions ($H_3O_2^-$) having oil particles wrapped therein are converted into water. This eventually releases the oil from the hydronium ions ($H_3O^+$) and hydroxyl ions ($H_3O_2^-$) resulting in separation into the oil and oil-free water. The charge of the oil stain-removed O/W emulsion-like washing water into hard water immediately leads to the separation into the oil and oil-free water. The separation involves oil and oil-free water phases, so that the oil can be readily removed subsequently.

Possibility of Industrial Utilization

As set out hereinbefore, the washing water of the invention comprises large amounts of hydronium ions ($H_3O^+$) having high surface activity and hydroxyl ions ($H_3O_2^-$) also having high surface activity and is able to remove oil, thus being usable for industrial and domestic washings. In addition, since any detergent is not used, no adverse influence on environments is produced.

The method for making washing water according to the invention comprises only passing water through an ion exchange resin and then through a mixture of tourmaline and a metal. Thus, production costs for the washing water is inexpensive. The apparatus simply makes use of the jetting force of water without use of electric power, thus production costs being inexpensive. Moreover, the apparatus of the invention needs only washing of filling materials or supplement of the filling materials and thus involves substantially no maintenance. Anyone can make washing or supplement of the materials.

In the practice of the invention, emulsified water after removal of oils and the like with the washing water is introduced only into ordinary water, permitting immediate separation into water and oil phases. Accordingly, existing expensive apparatus for separation into water and oil are not necessary, thereby achieving the water and oil separation inexpensively, simply and readily.

What is claimed is:

1. A method for making detergent-free washing water, comprising passing water first through an ion exchange resin and then through a powder mixture of tourmaline and a metal.

2. A method for making washing water according to claim 1, wherein said ion exchange resin is able to generate sodium ions through ion exchange.

3. A method for making washing water according to claim 1, wherein said metal is at least one of aluminum, stainless steels and silver.

4. A method for making washing water according to claim 3, wherein a mixing ratio by weight between said tourmaline and said metal ranges 1:10~1:10.

5. A method for making washing water according to claim 4, wherein the mixing ratio by weight between said tourmaline and said metal ranges 1:2~1:6.

6. A method for making washing water according to claim 1, wherein said tourmaline is obtained by mixing tourmaline at not less than 10 wt % relative to a ceramic and heating to 800° C. or higher.

7. A method for making washing water according to claim 1, wherein said tourmaline and said metal are agitated under hydraulic pressure.

8. An apparatus for making washing water which comprises a soft water generator accommodating an ion exchange resin therein, and an ion generator accommodating a mixture of tourmaline and a metal therein, said ion generator being connected to said soft water generator, wherein said ion generator includes means for jetting said water against the tourmaline and the metal under hydraulic pressure so that the tourmaline and the metal are agitated within the ion generator.

9. An apparatus for making washing water according to claim 8, wherein said ion generator includes a bottom and a top and further includes holes therethrough, said jetting means comprising said holes, wherein the water is passed within said ion generator from said bottom toward said top of said ion generator and the water passed through the holes is jetted against the tourmaline and the metal to agitate within said ion generator.

10. An apparatus for making washing water according to claim 8, wherein said soft water generator has a space, at the side of an inlet of the water, which is free of any ion exchange resin.

11. An apparatus for making washing water according to claim 8, wherein a plurality of soft water generators are connected in series.

12. A method for separating water and an oil from each other which comprises passing water through an ion exchange resin and a mixture of tourmaline and a metal to obtain a washing water, removing oil stains with said washing water, and mixing the resultant emulsified water after the removal of the oil stains with hard water whereby the emulsified water is separated into an oil and oil-free water.

13. A method for separating water and an oil according to claim 12, wherein the emulsified washing water after the removal of the oil stains is charged into hard water.

* * * * *

UNITED STATES PATENT AND TRADEMARK OFFICE
CERTIFICATE OF CORRECTION

PATENT NO.  : 5,599,455
DATED       : February 4, 1997
INVENTOR(S) : Toshiharu HUKAI It is certified that error appears in the above-identified patent and that said Letters Patent is hereby corrected as shown below:

Col. 4, line 52, "$Ca^{2-}$" should read --$Ca^{2+}$--.

Col. 5, line 38, "$(H_3O)$" should read --$H_3O^+$--; and
       line 47, "$(H_3O)$" should read --$H_3O^+$--.

Signed and Sealed this

Fourteenth Day of December, 1999

Attest:

Attesting Officer

Q. TODD DICKINSON

Acting Commissioner of Patents and Trademarks